(12) United States Patent
Denry et al.

(10) Patent No.: US 8,133,828 B2
(45) Date of Patent: Mar. 13, 2012

(54) LANTHANUM OXIDE-DOPED GLASS-CERAMICS

(75) Inventors: Isabelle L. Denry, Dublin, OH (US); Julie A. Holloway, Dublin, OH (US)

(73) Assignee: The Ohio State University Research Foundation, Columbus, OH (US)

( * ) Notice: Subject to any disclaimer, the term of this patent is extended or adjusted under 35 U.S.C. 154(b) by 265 days.

(21) Appl. No.: 12/465,093

(22) Filed: May 13, 2009

(65) Prior Publication Data

US 2009/0286666 A1  Nov. 19, 2009

Related U.S. Application Data

(60) Provisional application No. 61/052,859, filed on May 13, 2008.

(51) Int. Cl.
| | |
|---|---|
| C03C 10/16 | (2006.01) |
| C03C 10/04 | (2006.01) |
| C03C 10/10 | (2006.01) |
| C03C 3/112 | (2006.01) |
| C09K 3/00 | (2006.01) |

(52) U.S. Cl. .......... 501/3; 501/5; 501/6; 501/57; 106/35
(58) Field of Classification Search .................. 501/3, 4, 501/5, 6, 57, 72; 106/35; 433/201.1, 202.1, 433/203.1, 212.1
See application file for complete search history.

(56) References Cited

U.S. PATENT DOCUMENTS

| | | | | |
|---|---|---|---|---|
| 4,467,039 A | * | 8/1984 | Beall et al. | 501/3 |
| 5,066,619 A | * | 11/1991 | Kasuga et al. | 501/3 |
| 5,491,116 A | * | 2/1996 | Beall et al. | 501/5 |
| 5,705,273 A | | 1/1998 | Denry et al. | |
| 5,994,246 A | | 11/1999 | Denry | |
| 6,426,311 B1 | * | 7/2002 | Goto et al. | 501/4 |
| 6,645,285 B2 | * | 11/2003 | Brodkin et al. | 106/35 |
| 6,955,776 B1 | | 10/2005 | Fenstra | |
| 2002/0197583 A1 | | 12/2002 | Jones et al. | |
| 2004/0121894 A1 | | 6/2004 | Brodkin | |

FOREIGN PATENT DOCUMENTS

| | | |
|---|---|---|
| EP | 0529241 A1 | 8/1991 |
| WO | 2006-042046 A2 | 4/2006 |

OTHER PUBLICATIONS

Denry I, Holloway, J.A,, Effect of magnesium content on the microstructure and crystalline phases of fluoramphibole glass-ceramics. J Biomed Mater Res (Appl Biomater) 2000:53(4):289-96.

Denry I, Holloway, J.A., Effect of additives on the microstructure and thermal properties of a mica-based glass-ceramic. J Biomed Mater Res (Appl Biomater) 2002;63(2):146-51.

Denry I, Holloway, J.A., Texture Development in Heat-Pressed Fluoramphibole Glass-Ceramics. J Dent Res 2002;81:223 [Abstract #1692].

(Continued)

Primary Examiner — Jerry Lorengo
Assistant Examiner — Noah Wiese
(74) Attorney, Agent, or Firm — Calfee, Halter & Griswold LLP (57) ABSTRACT

Glass-ceramic compositions exhibiting high reliability and tensile strength are described. The compositions can include crystal phases including roedderite and/or potassium fluorrichterite. The glass-ceramic compositions are bioactive, and can be used as components of a wide variety of biomedical devices such as dental restorations.

17 Claims, 3 Drawing Sheets

OTHER PUBLICATIONS

Denry I, Holloway, J.A., Elastic constants, Vickers hardness, and fracture toughness of fluorrichterite-based glass-ceramics. Dent Mater 2004;20(3):213-19.

Denry I, Holloway, J.A., Effect of crystallization heat treatment on the microstructure and biaxial strength of fluorrichterite glass-ceramics. J Biomed Mater Res (Appl Biomater) 2007;80B(2):454-59.

Coon J, Shelby JE., Formation and properties of sodium lanthanum silicate glasses. Phys Chem Glasses 1994;35(2):47-51.

Shelby JE., Rare earths as modifiers in oxide glasses. Key Engeering Materials, vols. 94-95 (1994) pp. 43-80.

Makishima A., et al., Elastic moduli and refractive indices of aluminosilicate glasses containing Y2O3, La2O3 and TiO2. J Am Ceram Soc 1978;61:247-49.

Fresa et al., Effect of the substitution of La2O3 for CaO on the bioactivity of 2.5CaO. 2SiO2 glass. J Biomed Mater Res 1996;32:187-92.

Branda et al., The Role of Trivalent Element Oxides in Cao (Na2O)-M2O3-SiO2 Glasses From Tg. Journal of Thermal Analysis and Calorimetry 2001;64(3):1017-24.

Costantini et al., Thermal properties and devitrification behavior of (2.5-x)CaO.x/3La2O3.2SiO2. Thermochimica Acta348 (2000), 115-120.

Aronne et al., FTIR and DTA study of lanthanum aluminosilicate glasses. Materials Chemistry and Physics 1997;51(2):163-168).

Medhi, Mirsaneh, et al., Characterization of High-Fracture Toughness K-Fluorrichterite-Fluorapatite Glass Ceramics, J. Am. Ceram. Soc, 87 [2] 240-46 (2004).

International Search Report and Written Opinion of International Application No. PCT/US2009/043758, mailed Jan. 12, 2010.

\* cited by examiner

LANTHANUM OXIDE-DOPED GLASS-CERAMICS

CROSS-REFERENCE TO RELATED APPLICATION

This non-provisional application claims the benefit of U.S. Provisional Patent Application No. 61/052,859, entitled "High Strength Machinable Ceramic for Biomedical Application" and filed May 13, 2008, the entire disclosure of which is hereby incorporated by reference, to the extent that it is not conflicting with this application.

GOVERNMENT FUNDING

The present invention was made with government support by the NIH-NIDCR under Grant No. 2R01DE 13570. The Government has certain rights in this invention.

BACKGROUND

Glass-ceramics represent a useful class of biomaterials characterized by the presence of one or more crystalline phases within a glassy matrix. Glass-ceramics are typically very strong, exhibit higher strength than glass, have good corrosion resistance, and are either bioinert or capable of reacting with surrounding tissues as a result of being bioactive. Some biomedical ceramics, such as hydroxyapatite and tricalcium phosphate, are even biodegradable. Glass-ceramics have been used as components in a variety of biomedical applications, such as hip implants, dental implants, middle ear implants, and intervertebral spacers. However, while known glass-ceramics can exhibit outstanding strength when loaded in compression, glass-ceramics can fail at low stresses when loaded in tension or bending as a result of having insufficient tensile strength.

Fluorrichterite glass-ceramics represent a useful type of glass-ceramic biomaterials, and have been extensively studied. They are machinable, heat pressable, exhibit high strength and toughness, excellent chemical durability and remarkable resistance to slow crack growth. The fluorrichterite structure is similar to that of mica with basic building blocks consisting of $SiO_4$ tetrahedra assembled in rings of six. However, as opposed to the mica structure, the orientation of these rings alternates, leading to a more difficult cleavage along the basal planes and better mechanical properties. Previous work by the inventors has shown that these glass-ceramics were potential candidates as dental ceramics. See Denry et al., J. Biomed. Mater. Res. (Appl Biomater), 53(4), p. 289-96 (2000), Denry et al., J. Biomed. Mater. Res. (Appl Biomater) 63(2), p. 146-51 (2002), Denry et al., J. Dent. Res., 81, p. 223, Abstract #1692, (2002), and Denry et al., Dent. Mater, 20(3), p. 213-19 (2004).

One of the compositions studied exhibited a dual microstructure consisting of fluorrichterite prismatic crystals and mica platelets that promoted crack deflections and arrest, leading to a glass-ceramic with high flexural strength and high reliability. Denry et al., J. Biomed. Mater. Res (Appl Biomater), 80B(2), p. 454-59 (2007). However, glass-ceramics for use in dental applications preferably have visual characteristics that facilitate the production of aesthetically appealing restorations.

Lanthanum oxides were a potential candidate for modifying glass ceramics to produce aesthetically appealing restorations. It has been shown that additions of lanthanum oxide to silicate glasses results in an increase in elastic modulus and hardness. Makishima et al., J. Am. Ceram. Soc., 61, p. 247-49 (1978). Lanthanum oxide has also been shown to act as a network modifier in lanthanum aluminosilicate glasses, thereby decreasing viscosity at high temperature. (Aronne A, Esposito S, Pernice P. FTIR and DTA study of lanthanum aluminosilicate glasses. Materials Chemistry and Physics 1997; 51(2):163-168). Other studies have investigated the effect of lanthanum oxide on the bioactivity and properties of calcium silicate glasses. See Fresa et al., J. Biomed. Mater. Res., 32, p. 187-92 (1996), Branda et al., J. Thermal Analysis and Calorimetry, 64(3), p. 1017-24 (2001), and Costantini et al., Thermochimica Acta, 372(1-2), p. 67-74 (2001). For example, it was shown that lanthanum can partially substitute for calcium without significantly altering the bioactivity. Accordingly, there is a need to evaluate the effect of lanthanum oxide on the optical properties, crystallization behavior and microstructure of fluorrichterite glass-ceramics, to determine if lanthanum oxide is a suitable doping agent for tailoring the strength and processing conditions of fluorrichterite-based glasses.

SUMMARY OF THE INVENTION

The present inventors have evaluated the effects of lanthanum oxide on glass-ceramics, and have developed a number of materials and devices based on their efforts. In one aspect, the present invention provides a bioactive glass-ceramic composition that includes 50-70% $SiO_2$, 8-25% MgO, 1.5-9% $Na_2O$, 2-12% $K_2O$, 4-15% CaO, 0-2% BaO, 0-3% $Li_2O$, 3-8% F, and 0-8% $La_2O_3$ by weight percentage. The composition can also include 0.5 to 3.5 wt. % coloring and fluorescent metal oxides to provide a composition having a desired color and appearance.

Different embodiments of the glass-ceramic composition can have different properties. For example, one embodiment provides a glass-ceramic wherein the range of weight percentage of $La_2O_3$ is from about 0 to about 1. This embodiment may further include potassium fluorrichterite, exhibit a biaxial flexural strength from about 450 to about 500 MPa, and exhibit a Weibull modulus of 17 or more. Embodiments of the glass-ceramic including about 0 to about 1% $La_2O_3$ may also include large prismatic crystals having a length of about 2 micrometers and small crystals with a hexagonal section and a diameter of about 60 to 80 nanometers.

Another embodiment provides a glass-ceramic wherein the range of weight percentage of $La_2O_3$ is from about 5 to about 8. This embodiment may further include roedderite, exhibit a biaxial flexural strength from about 350 to about 400 MPa, and exhibit a Weibull modulus of 17 or more. Embodiments of the glass-ceramic including about 5 to about 8% $La_2O_3$ may also include well-dispersed, interlocking prismatic crystals with a size of about 2×0.3 micrometers.

Another aspect of the invention provides a biomedical device comprising a bioactive glass-ceramic composition that includes 50-70% $SiO_2$, 8-25% MgO, 1.5-9% $Na_2O$, 2-12% $K_2O$, 4-15% CaO, 0-2% BaO, 0-3% $Li_2O$, 3-8% F, and 0-8% $La_2O_3$ by weight percentage. Embodiments of the biomedical device can include devices selected from the group consisting of bone plates, middle ear implants, intervertebral spacers, scaffolds, machinable blanks, and dental restorations. In further embodiments, the dental restoration can be selected from the group consisting of inlays, onlays, bridges, abutments, facings, veneers, facets, crowns, partial crowns, frameworks, copings, and dental implants. Biomedical devices preferably include bioactive glass-ceramic compositions with a biaxial flexural strength from about 350 to about 500 MPa and a Weibull modulus of 17 or more.

DETAILED DESCRIPTION OF THE INVENTION

The hypothesis that lanthanum oxide addition could increase the strength, reliability, and/or crystallization temperature of glass-ceramic compositions was confirmed. Three glass compositions with lanthanum oxide content varying from about 0 to 6 wt. % were prepared. After melting at 1450° C. for 2 hours, the glasses were cast into ingots. Discs were cut from the ingots and heat treated in the temperature range of 600 to 925° C. The crystallization behavior was evaluated by differential thermal analysis (DTA), X-ray diffraction (XRD), and scanning electron microscopy (SEM). The biaxial flexural strength of the materials was measured after various heat treatments.

XRD revealed the presence of potassium fluorrichterite, mica, and roedderite in the lanthanum-free glass-ceramic and the glass-ceramic containing about 3 wt. % lanthanum oxide after heat treatment at 900° C. for 1 hour, while only roedderite, mica and diopside were present in the glass-ceramic containing about 6 wt. % lanthanum oxide. DTA confirmed the presence of two to three exotherms occurring in the 630-965° C. temperature range. Lanthanum oxide additions led to an increase in the crystallization temperature of the various phases. The microstructure of the lanthanum-free glass-ceramic and the glass-ceramic containing about 3 wt. % lanthanum oxide consisted of a mix of platelet-shaped mica and prismatic fluorrichterite crystals.

The glass-ceramic with about 6 wt. % lanthanum oxide addition exhibited a highly crystalline microstructure consisting of small platelet-shaped crystals and well-dispersed prismatic crystals, with dimensions of about 2×0.3 micrometers (μm). The refractive index of the glasses increased linearly with the amount of lanthanum oxide added. The addition of lanthanum oxide to fluorrichterite glass-ceramics favored the formation of roedderite while increasing the crystallization temperature of mica and diopside. The biaxial flexural strength was highest for the lanthanum-free glass-ceramic (498±25 MPa), followed by the glass-ceramic containing about 6 wt. % lanthanum oxide (389±26 MPa) and the glass-ceramic containing about 3 wt. % lanthanum oxide (274±20 MPa). The Weibull modulus of the lanthanum-free glass-ceramic was 17.8 while the Weibull modulus of the glass-ceramic containing about 6 wt. % lanthanum oxide was 17.8, indicating excellent reliability in both cases.

DEFINITIONS

The terminology as set forth herein is for description of the embodiments only and should not be construed as limiting of the invention as a whole. Unless otherwise specified, "a," "an," "the," and "at least one" are used interchangeably. Furthermore, as used in the description of the invention and the appended claims, the singular forms "a", "an", and "the" are inclusive of their plural forms, unless contraindicated by the context surrounding such.

Also herein, the recitations of numerical ranges by endpoints include all numbers subsumed within that range (e.g., 1 to 5 includes 1, 1.5, 2, 2.75, 3, 3.80, 4, 5, etc.).

A glass, as defined herein, is a composition of at least 50% silicon dioxide (i.e., a silicate glass) that also includes additives such as calcium oxide that provides a hard but brittle low strength material having an amorphous structure. A glass-ceramic, on the other hand, is a glass that has been subject to controlled devitrification to promote crystal nucleation and growth, resulting in a material with significantly higher strength and toughness.

Fluorrichterites, as referred to herein, are chain silicates that crystallize as prismatic needle-shaped crystals, and have the formula $NaCaMg_5Si_8O_{22}F_2$. Potassium fluorrichterite has a formula of $(KNa)CaMg_5Si_8O_{22}F_2$. Tetrasilicic fluormica has the formula $KLiMg_{2.5}Si_4O_{10}F_2$, roedderite is a crystalline phase having the formula $(Na,K)_2Mg_5Si_{12}O_{30}$, and diopside is a monoclinic pyroxene crystalline phase with the formula $MgCaSi_2O_6$.

The following compound abbreviations are provided herein. $SiO_2$ is silicon dioxide; MgO is magnesium oxide, or magnesia; $Na_2O$ is sodium oxide; $K_2O$ is potassium oxide; CaO is calcium oxide; BaO is barium oxide; $Li_2O$ is lithium oxide or lithia; $CaF_2$ is calcium fluoride; F is fluorine; and $La_2O_3$ is lanthanum oxide.

A bioactive glass-ceramic, as referred to herein, is a glass-ceramic material that encourages the formation of new tissue on its surface to improve integration of the material into the surrounding biological environment. For example, bioactive glass-ceramic materials used for bone-tissue repair or related applications can encourage the formation of new bone tissue on their surface after implantation into existing bone (i.e., osteoconduction) or induce de novo formation of bone tissue irrespective of the site of implantation (i.e., osteoinduction).

The present invention is directed to bioactive glass-ceramic compositions consisting essentially of 50-70% $SiO_2$, 8-25% MgO, 1.5-9% $Na_2O$, 2-12% $K_2O$, 4-15% CaO, 0-2% BaO; 0-3% $Li_2O$; 3-8%, and 0-8% $La_2O_3$, based on weight percentage of these components relative to the weight of the whole. These bioactive glass-ceramic compositions can be varied by subjecting them to varying levels of heat treatment, and by varying the initial composition of the glass-ceramic within the ranges provided. Guidance on variation of the composition limits for materials other than the lanthanum oxide in the glass-ceramic composition can be found in U.S. Pat. No. 4,467,039, the disclosure of which is incorporated herein by reference.

Lanthanum oxide ($La_2O_3$) addition can increase the strength, reliability, and/or crystallization temperature of glass-ceramic compositions. To prepare these compositions, lanthanum oxide is typically substituted for sodium oxide in order to keep the same nominal ratio of non-bridging oxygens to tetrahedral cations as would be present in a more conventional fluorrichterite glass-ceramic. To provide materials with differing properties, different amounts of lanthanum oxide can be added.

Any amount of $La_2O_3$ that would result in a composition including from 0 to 8%, by weight of lanthanum oxide, or an amount or subrange within this range, can be included. For example, amounts of $La_2O_3$ suitable to result in a glass-ceramic including about 0 to 8% by weight $La_2O_3$ can be included. In other embodiments, to assure that at least a minimal amount of $La_2O_3$ is added, an amount of lanthanum oxide suitable to result in a glass-ceramic including about 0.1 to 8% by weight of lanthanum oxide can be included. Further compositions can include amounts of $La_2O_3$ is from about 0 to about 3%, from about 0 to about 2%, or from about 0 to about 1%, by weight percent, or similar ranges in which 0 is replaced with 0.1% to provide a minimal amount of $La_2O_3$. Other compositions can include a weight percentage of $La_2O_3$ from about 3 to about 5%, from about 3 to about 4%, or about 3.2%. Further compositions can include a weight percentage of $La_2O_3$ is from about 5 to about 8%, from about 5 to about 7%, from about 5.5 to about 6.5%, or about 6.3%.

The glass-ceramic compositions can also be varied by preparing them under different conditions. For example, the glass-ceramic compositions can be varied by altering the level or duration of heat treatment.

The process for preparing the glass-ceramic compositions typically includes a number of different steps. In the first step, a batch with a predetermined composition is melted. Batches can be prepared from inexpensive, readily available raw materials such as sand, soda ash, potash, fluorspar, and magnesia, which can be formed into a powder using any suitable technique such as grinding in a mortar. Melting can be brought about by heating the predetermined composition to about 1400° C. for a suitable amount of time. For example, the predetermined composition can be placed in a crucible and heated in an electric furnace. The melted composition (i.e., the melt) is then poured into a mold (e.g., a graphite mold) to provide a desired shape, after which the melt is furnace-cooled to room temperature to provide a glass.

The glass composition is then subjected to heat treatment in order to cause crystallization and convert the glass to a glass-ceramic. The heat treatment can include reheating of the glass in a variety of different ways. For example, the glass can be reheated to a single temperature from about 500 to about 1000° C. for a period of time sufficient to cause the growth of crystals in situ. Alternately, the glass can be heat treated for a time at a first temperature, and then heat treated for an additional period of time at a second, higher temperature. The periods of heating can have various durations from about 1 to about 5 hours, and the heat can be changed from the first temperature to the second temperature at a rate from about 5° C./min to about 10° C./min. The first heat treatment step can be carried out at a temperature from about 550 to 650° C., with a temperature of about 585° C. being preferred. The second heat treatment step can be carried out at a temperature from about 700 to about 950° C., with a range from about 890 to about 925° C. being preferred. Specific examples of two-step heat treatments can be found in the detailed example provided herein. It is understood by those skilled in the art that the first heat treatment step provides nucleation, while the second heat treatment step provides crystal growth on the earlier formed nuclei, and that crystallization is typically more uniform and fine-grained if the heat treatment of the glass is undertaken in two stages. Interestingly, lanthanum appears to increase the viscosity of the glassy matrix, thereby permitting crystallization in the second heat treatment step to occur at a higher temperature.

Depending on the amount of $La_2O_3$ used and the conditions under which the glass-ceramic is prepared, compositions including a variety of different phases can result. For example, compositions including various amounts of mica, diopside, potassium fluorrichterite, and roedderite can be prepared. Compositions including little $La_2O_3$ will tend to include potassium fluorrichterite, while compositions including more $La_2O_3$ will tend to include roedderite. The type and amount of phases in the composition can be determined using methods known to those skilled in the art, such as X-ray diffraction (XRD).

The amount of $La_2O_3$ used and the conditions under which the glass-ceramic is prepared can also affect the character of the crystallization in the material obtained. For example, crystals can vary in length, width, and character (e.g., disc, rod, polygon). The relation between separate crystals (e.g., single or interwoven) can also vary. The nature of the crystals can be evaluated by various methods known to those skilled in the art, such as transmission electron microscopy. Public domain software developed by the U.S. National Institutes of Health is also available to help calculate the average dimensions of the crystals measured. See information regarding the "NIH Image" processing and analysis program at http://rsb.info.nih.gov/nih-image/.

The amount of $La_2O_3$ used and the conditions under which the glass-ceramic is prepared can also affect the properties of the material obtained. For example, the glass-ceramic can have a biaxial flexural strength from about 250 MPa to about 500 MPa. Other more narrow ranges, such as a biaxial flexural strength from about 350 to about 500 MPa, or from 350 to about 400 MPa, may also be suitable for representing the properties of the glass-ceramics obtained under specific conditions. The reliability of a glass-ceramic material can be represented by the Weibull modulus. The Weibull modulus is a dimensionless number corresponding to the variability in measured strength, and reflects the distribution of flaws in the material. Test procedures for determining the Weibull modulus are specified in Deutsches Institut für Normung (DIN) EN 843-5 and DIN 51 110-3. The Weibull modulus for glass-ceramic materials of the present invention range from about 7 to about 18. Depending on the amount of $La_2O_3$ used and the conditions under which the glass-ceramic is prepared, the Weibull modulus can have a value of about 10, about 12, about 15, about 17, or about 17.5.

Maximum radial and tangential stresses, which measure the tensile strength of a glass-ceramic material, can be calculated from the following equation using biaxial strength measurements obtained using methods described by Wachtman et al., J. Mater. Sci., 7, p. 188-94 (1972).

$$\sigma_m = \frac{3P(1+v)}{4\pi t^2}\left[1 + 2\ln(a/b) + \frac{(1-v)}{(1+v)}\left[1 - \frac{b^2}{2a^2}\right]\frac{a^2}{R^2}\right]$$

While not intending to be bound by theory, data obtained indicates that an additional strengthening mechanism may be involved in the relatively high tensile strength and Weibull modulus values obtained for glass-ceramic materials of the invention. Examination by scanning electron microscopy indicates the presence of a surface layer consisting of unusual hollow roedderite crystals that might contribute to the strength and reliability of the glass-ceramic materials obtained. In addition, a surface reaction leading to the formation of a low expansion roedderite layer that occurs during the dwell at high temperature or the cooling cycle might also explain the observed increase in flexural strength. Due to the low expansion of the roedderite phase compared to that of the inner fluorrichterite glass-ceramic, compressive stresses develop in this layer during cooling while tensile stresses are present in the core fluorrichterite glass-ceramic. These compressive stress must be overcome for a crack to propagate and for failure of the glass-ceramic to occur, thereby increasing the fracture resistance of the material. See Denry et al., J. Biomed. Mater. Res. Part B, Appl. Biomater 80B, p. 454-459 (2007).

The bioactive glass-ceramic compositions described can be used in biomedical devices. A biomedical device, as defined herein, is a medical device made to replace and/or act as a missing biological structure, and is formed from a biocompatible material that results in minimal adverse interactions with the surrounding tissue. Accordingly, the invention provides biomedical devices in which at least a substantial portion of the biomedical device is a bioactive glass-ceramic composition consisting essentially of: 50-70% $SiO_2$, 8-25% MgO, 1.5-9% $Na_2O$, 2-12% $K_2O$, 4-15% Ca, 0-2% BaO, 0-3%; $Li_2O$, 3-8%; and 0-8% $La_2O_3$, by weight percentage. The bioactive glass-ceramic composition can be prepared and modified as already described herein. A substantial portion, as used in this regard, refers to a biomedical device in which at least 25%, of the device comprises the glass-ceramic composition. However, a substantial portion can also refer to a biomedical device made up of at least 50%, at least 75%, or even 100% of the glass-ceramic composition.

The biomedical device can be a wide variety of different types of medical devices. The biomedical devices including bioactive glass-ceramic compositions are typically, but not always, used in situations where bone or bone-like material is being replaced. Glass-ceramic compositions used in biomedical devices should be bioactive to encourage integration with adjacent tissue, and preferably should have a biaxial flexural strength from about 350 to about 500 MPa and/or a Weibull modulus of about 17 in order to provide sufficient tensile strength and reliability. However, for some embodiments, glass-ceramic compositions with less durability and reliability may be used, and in some cases may even be preferred.

Examples of biomedical devices include implantable biomedical devices and dental biomedical devices, which are not mutually exclusive. Examples of implantable biomedical devices include joint replacements (e.g., a hip implant), intervertebral spacers, bone plates, dental implants, middle ear implants, and scaffolds. Examples of dental biomedical devices include machinable blanks and dental restorative materials used for the restoration of damaged teeth and the replacement of missing teeth. The bioactive glass-ceramic compositions of the invention can be utilized in the fabrication of a wide variety of dental restorations such as all-ceramic restorations, inlays, onlays, bridges, veneers, fixed partial prostheses, abutments, facings, facets, crowns, partial crowns, frameworks, copings and dental implants, the nature of which are all known to those skilled in the art. It is further contemplated that the bioactive glass-ceramic composition can be utilized as a ceramic core for an all-ceramic restoration.

Dental restorative materials and other biomedical devices can be prepared from ingots of the bioactive glass-ceramic composition which are produced and then heat-pressed by the lost wax technique. The glass-ceramic ingot is placed in a special heat-pressing machine (for example, the Optimal™ Autopress™ hot press available from Jeneric/Pentron, Inc., Wallingford, Conn.) and is softened and pressed in the investment mold. The softened material fills the void left by the wax pattern. After cooling, the hardened ceramic is broken out of the investment. Where desired, one or more layers of the bioactive glass-ceramic can be applied over a ceramic core and/or ceramic stains can be fired onto the surface of the restoration to simulate tooth color. Compositions can also include 0.5 to 3.5 wt. % coloring and fluorescent metal oxides to provide a glass-ceramic composition having the desired color and appearance characteristics.

In another embodiment, a partially crystallized ceramic blank or ingot can be produced by partial heat treatment, thereby inducing the crystallization of the mica phase, which is known to render ceramics machinable. A blank or block is a standardized shape that is typically produced and sold to a dental practitioner or technician who further shapes the blank into a dental restoration. The partially crystallized mica-containing ceramic blank or ingot can be further shaped by grinding or milling or using currently available computer-based milling devices. The restoration can then be fully crystallized to promote the crystallization of fluorrichterite, roedderite and diopside or a combination thereof, to achieve adequate strength and toughness.

The present invention is illustrated by the following example. It is to be understood that the particular example, materials, amounts, and procedures are to be interpreted broadly in accordance with the scope and spirit of the invention as set forth herein.

EXAMPLE

Effect of Lanthanum Oxide on the Crystallization Behavior of Fluorrichterite Glass-Ceramics Materials and Methods Three glass compositions, with about 0, 3 or 6 weight percent lanthanum oxide additions were prepared (Table 1). These compositions were calculated so that lanthanum oxide was substituted for sodium oxide in order to keep the same nominal ratio of non-bridging oxygens to tetrahedral cations. The batch ingredients were mixed together and the compositions melted at 1450° C. for 2 hours in platinum crucibles. The molten glass was cast into 12×60 mm ingots that were furnace-cooled to room temperature. Differential thermal analyses were performed on the powdered glasses of each composition to determine the glass transition and crystallization temperatures. Discs (1 mm thick, 12 mm in diameter) were cut from the ingots and heat treated in the temperature range 600-925° C. for various durations. The microstructure of the heat treated specimens was investigated by scanning electron microscopy. The biaxial flexural strength was measured on a ball on ring-of-balls fixture at a cross-head speed of 0.5 mm/min in a universal testing machine. Weibull statistics were used to analyze the data.

TABLE 1

| Glass compositions prepared (wt. %) | | | |
|---|---|---|---|
| $SiO_2$ | 61.6 | 60.7 | 59.9 |
| MgO | 15.1 | 14.9 | 14.7 |
| $CaF_2$ | 3.7 | 3.7 | 3.6 |
| $Na_2O$ | 5.6 | 3.7 | 1.8 |
| $La_2O_3$ | 0.0 | 3.2 | 6.3 |
| $K_2O$ | 8.1 | 8.0 | 7.9 |
| LiF | 4.9 | 4.8 | 4.7 |
| BaO | 0.9 | 0.9 | 0.9 |

Results

Figure 1:
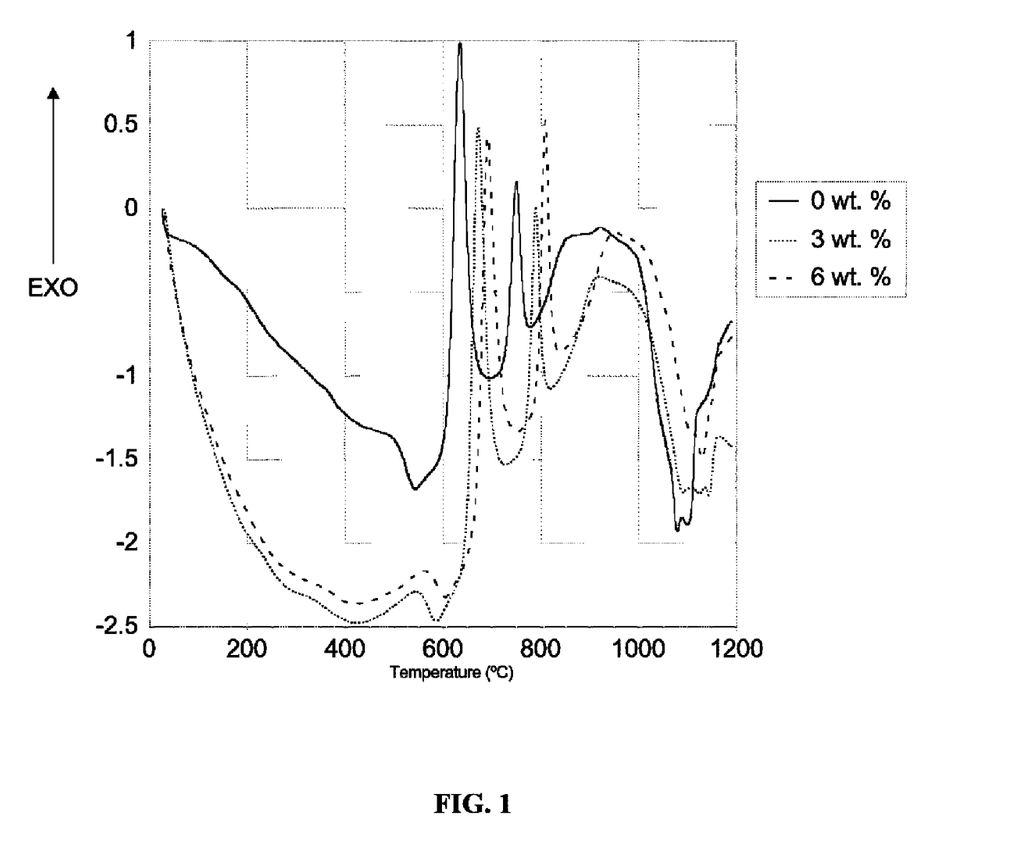
FIG. 1 provides a graph showing the differential thermal analyses of glasses including 0 wt. %, 3.2 wt. %, and 6.3 wt. % lanthanum oxide.

Differential thermal analyses of the various glasses are displayed in FIG. 1. They were characterized by three exothermic peaks, corresponding to crystallization and one endothermic peak, corresponding to melting. The temperature of the crystallization exotherms 1 and 2 increased linearly with the amount of lanthanum oxide added to the composition.

X-ray diffraction analyses (FIG. 2) showed that after nucleation and crystallization heat treatment at 900° C. for one hour, the base composition (i.e., with 0% lanthanum oxide) contained three phases: potassium fluorrichterite, fluormica and roedderite. The composition with 3.2 wt. % lanthanum oxide added contained the same three phases in lesser amounts, together with diopside. The composition with 6.3 wt. % lanthanum oxide contained only roedderite, diopside and mica with no fluorrichterite in detectable amounts.

TABLE 2

Crystalline phases as a function of heat treatment as determined by x-ray diffraction.

| Wt. % $La_2O_3$ | Heat treatment | Mica | Diopside | K-fluorrichterite | Roedderite |
|---|---|---|---|---|---|
| 0 | 700° C./1 h | +++ | ++++ | – | – |
| 3.2 | | + | +++ | – | – |
| 6.3 | | + | +++ | – | – |
| 0 | 800° C./1 h | ++ | + | +++ | + |
| 3.2 | | ++ | +++ | – | – |
| 6.3 | | + | +++ | – | – |
| 0 | 900° C./1 h | ++ | + | +++ | + |
| 3.2 | | ++ | ++ | ++ | + |
| 6.3 | | + | ++ | – | ++ |
| 0 | 585° C./1 h | + | – | ++++ | ++++ |
| 3.2 | 900° C./1 h | ++ | +++ | +++ | ++ |
| 6.3 | | ++ | +++ | – | ++++ |

Figure 2:
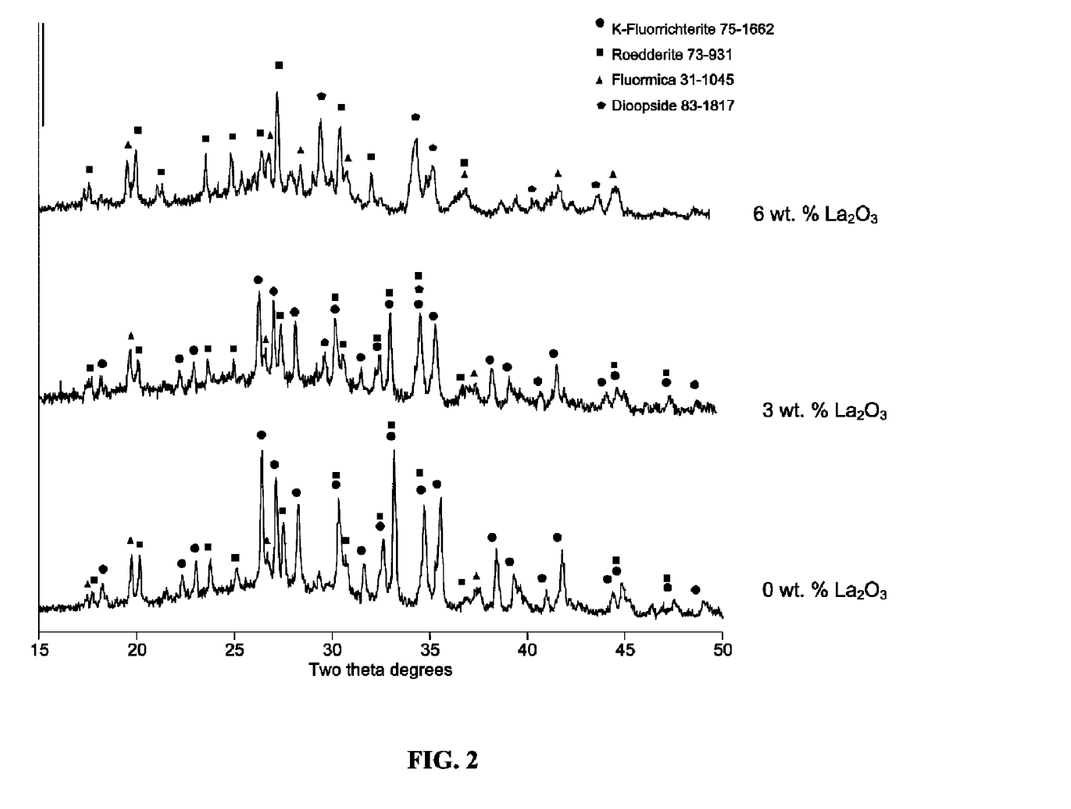
FIG. 2 provides graphs showing the X-ray diffraction patterns of glasses including 0 wt. %, 3.2 wt. %, and 6.3 wt. % lanthanum oxide.

The evolution of the crystalline phases as a function of heat treatment temperature is summarized in Table 2. The temperature at which the various phases appear is shifted upwards as the amount of lanthanum oxide added increases. In the base composition, the formation of fluorrichterite is associated with a decrease in the amount of mica and diopside phases. Fluorrichterite did not crystallize in the glass-ceramic containing 6.3 wt. % lanthanum oxide within the temperature range tested, however roedderite was present after heat treatment at 900° C. for one hour. Heat treatment of the glass with 6.3 wt. % lanthanum oxide addition at 925° C. for 1 hour led to an increase in the amount of roedderite formed, accompanied by a decrease in the amount of fluormica and diopside.

Figure 3:
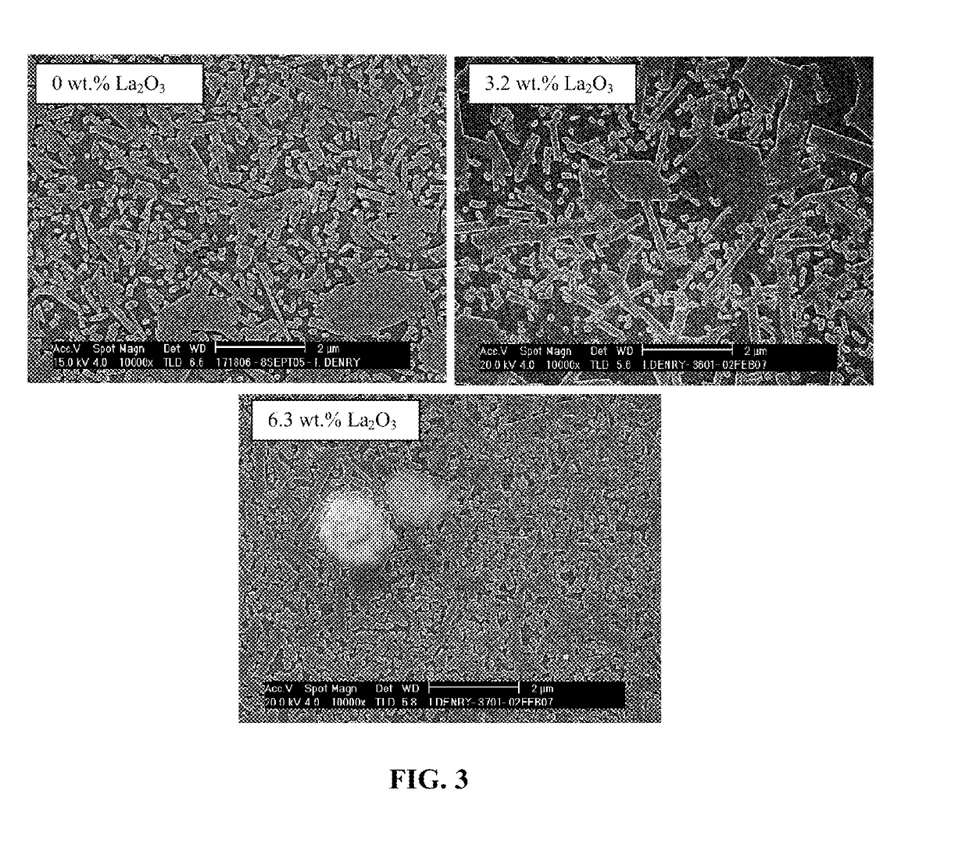
FIG. 3 provides scanning electron micrographs showing the microstructure of glass-ceramics including 0 wt. %, 3.2 wt. %, and 6.3 wt. % lanthanum oxide.

The microstructure (FIG. 3) of the lanthanum oxide-free base composition showed medium levels of crystallinity, with large prismatic crystals about 2 micrometers in length together with small crystals of hexagonal section and diameter of about 60 to about 80 nanometers. The crystallinity appeared to decrease in the glass-ceramic containing 3.2 wt. % lanthanum oxide, however, the microstructure was very similar to that of the base glass-ceramic in terms of crystal size and shape. A higher degree of crystallinity is noticeable in the glass-ceramic containing 6.3% lanthanum oxide. Large prismatic crystals of brighter contrast could correspond to the diopside phase while small crystals of hexagonal section are also noted, together with medium-sized prismatic crystals, leading to a very intricate microstructure.

The mean flexural strength of the base composition after nucleation and crystallization heat treatment at 900° C. for 1 hour was 498 MPa with a Weibull modulus of 17.7, but decreased to 274 MPa with a 3.2% addition and 337 MPa with a 6.3% addition of lanthanum oxide. Increasing the heat treatment temperature led to a decrease in flexural strength for both base composition and 3% addition but an increase for the 6% lanthanum oxide addition, while retaining a high Weibull modulus (17.8).

TABLE 4

Mean biaxial flexural strength and Weibull modulus of the various compositions as a function of heat treatment.

| Heat treatment | Wt % $La_2O_3$ | Biaxial flexural strength (MPa) | Weibull modulus |
|---|---|---|---|
| 585° C./1 h + 900° C./1 h | 0.0 | 497.6 ± 25.5 | 17.7 |
| 585° C./1 h + 910° C./1 h | 0.0 | 392.2 ± 55.3 | 7.5 |
| 585° C./1 h + 900° C./1 h | 3.2 | 273.7 ± 20.1 | 12.7 |
| 585° C./1 h + 915° C./1 h | 3.2 | 261.4 ± 19.6 | 12.6 |
| 585° C./1 h + 900° C./1 h | 6.3 | 337.0 ± 36.6 | 10.2 |
| 585° C./1 h + 925° C./1 h | 6.3 | 389.3 ± 25.7 | 17.8 |

Discussion

Lanthanum oxide additions strongly affected the crystallization kinetics, microstructure and flexural strength of the glass-ceramics. The temperature of the crystallization exotherms previously identified as those of fluormica and diopside for the base composition increased linearly with the addition of lanthanum oxide. This seems to indicate that lanthanum acts by increasing the viscosity of the glassy matrix, thereby permitting crystallization to occur at higher temperature. In fact, there was a linear relationship between the amount of lanthanum oxide, the glass transition temperature and the temperature of the first or second exotherms. Lanthanum oxide additions to alkali silicate glasses are known to increase the glass transition temperature. This can be explained by the greater strength of La—O bonds compared to Na—O.

It is interesting to note that fluorrichterite did not crystallize in the glass-ceramic containing 6.3% lanthanum oxide and that the three phases present after heat treatment at 900° C. were fluormica, diopside and roedderite. This might indicate that, in the presence of lanthanum, some of the calcium and fluoride remain in the glassy matrix and are unavailable for the formation of fluorrichterite. Heat treatment at 925° C. only revealed an increase in the amount of roedderite associated with an increase in crystallinity and biaxial flexural strength.

CONCLUSION

Lanthanum additions led to the crystallization of roedderite in place of fluorrichterite and a glass-ceramic with a high crystallinity. The flexural strength and Weibull modulus after heat treatment at 925° C. were comparable to that of the lanthanum-free glass-ceramic and both significantly higher than currently available heat-pressable ceramics for dental applications. Concurrently, roedderite has been shown to be at least partly responsible for the high strength of the lanthanum-free glass-ceramic, crystallizing as hollow tubular crystals at the surface of the material. Its calcium-free structure indicates that more calcium is present in the glassy matrix of the glass-ceramic, potentially increasing the bioactivity of these glass-ceramics.

The complete disclosure of all patents, patent applications, and publications, and electronically available materials cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A bioactive glass-ceramic composition consisting essentially of:
   $SiO_2$: 50-70;
   MgO: 8-25;
   $Na_2O$: 1.5-9;
   $K_2O$: 2-12;
   CaO: 4-15;
   BaO: 0-2;
   $Li_2O$: 0-3;
   F: 3-8; and
   $La_2O_3$: 0.1-8
   by weight percentage.

2. The glass-ceramic according to claim 1, wherein the range of weight percentage of $La_2O_3$ is from about 0.1 to about 1.

3. The glass-ceramic according to claim 2, wherein the composition comprises potassium fluorrichterite.

4. The glass-ceramic according to claim 2, wherein the composition has a biaxial flexural strength from about 450 to about 500 MPa.

5. The glass-ceramic according to claim 4, wherein the composition has a Weibull modulus of 17 or more.

6. The glass-ceramic according to claim 2, wherein the composition includes large prismatic crystals having a length of about 2 micrometers and small crystals with a hexagonal section and a diameter of about 60 to 80 nanometers.

7. The glass-ceramic according to claim 1, wherein the range of weight percentage of $La_2O_3$ is from about 5 to about 8.

8. The glass-ceramic according to claim 7, wherein the composition comprises roedderite.

9. The glass-ceramic according to claim 7, wherein the composition has a biaxial flexural strength from about 350 to about 400 MPa.

10. The glass-ceramic according to claim 9, wherein the composition has a Weibull modulus of 17 or more.

11. The glass-ceramic according to claim 7, wherein the composition comprises well dispersed, interlocking prismatic crystals with a size of about 2×0.3 micrometers.

12. The glass-ceramic according to claim 1, wherein the composition further comprises 0.5 to 3.5 wt. % coloring and fluorescent metal oxides.

13. A biomedical device comprising a bioactive glass-ceramic composition consisting essentially of:
    $SiO_2$: 50-70;
    MgO: 8-25;
    $Na_2O$: 1.5-9;
    $K_2O$: 2-12;
    CaO: 4-15;
    BaO: 0-2;
    $Li_2O$: 0-3;
    F: 3-8; and
    $La_2O_3$: 0.1-8
    by weight percentage.

14. The biomedical device of claim 13, wherein the device is selected from the group consisting of bone plates, middle ear implants, intervertebral spacers, scaffolds, blanks, and dental restorations.

15. The biomedical device of claim 14 comprising a dental restoration selected from the group consisting of inlays, onlays, bridges, abutments, facings, veneers, facets, crowns, partial crowns, frameworks, copings, and dental implants.

16. The biomedical device of claim 14, wherein the bioactive glass-ceramic composition has a biaxial flexural strength from about 350 to about 500 MPa.

17. The biomedical device of claim 15, wherein the bioactive glass-ceramic composition has a Weibull modulus of 17 or more.

* * * * *